United States Patent Office 3,518,344
Patented June 30, 1970

3,518,344
TABLETING LUBRICANT
Thomas Laurence Welsh and George Ronald Tomaich, Elkhart, Ind., assignors to Miles Laboratories, Inc., Elkhart, Ind., a corporation of Indiana
No Drawing. Filed Oct. 2, 1967, Ser. No. 672,004
Int. Cl. A61j 3/10; A61k 11/02, 11/04
U.S. Cl. 424—44          3 Claims

ABSTRACT OF THE DISCLOSURE

An improvement in the process of compressing powdered tabletable materials is gained by mixing with said materials prior to tableting, a lubricant comprising, in combination, a siloxane polymer and dry-mixable particles of a lubricating oil coated with an oil-insoluble film-forming substance. The lubricant acts as both a punch face lubricant and as a diewall lubricant for said tabletable materials. The powdered tabletable materials lubricated with the above lubricant can be those intended for general cleaning of solid surfaces or those intended for therapeutic employments.

Background of the invention

This invention relates to a tableting lubricant which can be mixed with powdered tabletable materials to provide lubrication during the compression thereof into tablets. More particularly, it relates to the use of a combination of a siloxane polymer and dry-mixable particles of a lubricating oil coated with an oil-insoluble film-forming substance.

Tableting lubricants perform the general functions of providing (1) lubrication for the punch surfaces which come into contact with the compressed composition, and (2) lubrication for the surfaces of the diewalls in which the tablet is formed. Both of these lubrication functions must be satisfied if the powdered tabletable material of interest is to be tableted commercially using high speed power-driven tableting machines. Some prior lubricants have provided only one of these two necessary lubrication functions and hence have necessitated the joint use of other lubricants. Of these two general functions many prior lubricants have not performed the first thereof which is to provide lubrication for the punch surfaces. The lack of such lubrication allows the particles of the material being tableted to adhere to the punch surface with the result that a rough surface appears on the finished tablet, preventing said tablet from having an elegant appearance.

Another general problem with the prior lubricants has been their insolubility which causes a tablet formed from an otherwise soluble composition to produce a clouded suspension having undesirable surface scum rather than a uniform solution when dissolved in water. Talc and magnesium stearate are examples of such lubricants. Other lubricants are precluded in one or more marketing areas because of their toxicity. Examples of such lubricants are boric acid and benzoic acid.

A lubricant which has found use in small scale tableting operations is corn oil. The main drawback in respect to the use of such oil for a lubricant is that it can only be added in small quantities to the tabletable composition and must be added immediately prior to tableting the mass. Further, it tends to wet the composition rendering mixing difficult. One attempt to overcome some of these mixing problems has been the use of solvents to dilute the corn oil. This necessitates the use of special equipment and handling procedures in order to recover the solvent, and this makes the use of such oil commercially unattractive.

It has been found that particles of a lubricant oil can be coated with a coating of an oil-insoluble film-forming substance in order to make the oil particles so coated dry-mixable. The coated oil particles can advantageously be incorporated into powdered tabletable materials in combination with a siloxane polymer which aids the surface lubrication properties of the combined lubricant. The presence of the siloxane polymer also aids the free-flowing nature of the lubricant itself. When this combined lubricant is mixed with a dry material, the resulting mixtures are essentially free-flowing.

It is, therefore, an object of this invention to provide an improved process of compressing a powdered tabletable material into tablet form by mixing a combination of a siloxane polymer and coated oil particles with said material prior to compression.

Another object of the present invention is to provide a tableting lubricant for tabletable powdered materials which comprises a combination of siloxane polymer and dry-mixable particles of an oil coated with an oil-insoluble film-forming substance.

Yet another object of this invention is to provide a process by which such a combined lubricant can be manufactured.

Summary of the invention

The combination of the siloxane polymer and the coated oil particles can be used with powdered tabletable materials to furnish lubrication thereof. This combination lubricant when mixed with the tabletable material prior to compression provides the necessary lubrication functions. While various amounts of the lubricant can be mixed with such materials depending upon the presence therein of other lubricants which impart lubrication and depending upon the tableting speed desired, it is usually sufficient to use at least about 0.5 percent by weight of the lubricant based on the weight of the lubricated powdered tabletable material. If desired, the lubricant can be used in large amounts approaching the limit of about 50 percent of the total tablet weight at which point excess lubricating oil is evident on the tablet surface, which is generally undesirable. Preferably, less than about 5 weight percent of the lubricant is employed.

The coated oil particles of the present invention have average diameters of about from 1 micron to 50 microns. The amount of the film-forming substance used is less than that necessary to entirely coat the oil particles with a continuous thick, resinous coat. The use of a minimal workable amount of the film-forming material with respect to the oil is preferred, but is not a critical feature of the invention. However, the relatively thin coating thus produced appears to allow improved lubrication.

The primary advantages of the combination tableting lubricant of the present invention are that the lubricant is nearly free-flowing and that it imparts good surface lubrication properties to tabletable materials lubricated with the same. The inclusion of the combination lubricant into tabletable materials prior to compression aids the flow of these materials into the dies of tableting machines and, upon compression and subsequent ejection of the tabletable materials, aids in maintaining the punch and die surfaces free from any retained materials which would otherwise, if allowed to build up, cause poor tableting characteristics. The combination lubricant, itself, is dry-mixable in character, which renders it easily mixed and homogenized with various tabletable powdered materials. This characteristic may be defined as the ability of the lubricant to be homogeneously mixed with dry powders as if it were itself a completely dry powder. This characteristic allows the lubricated tabletable material to be free-flowing. Another advantage of the combination lubricant of this invention is that when dispersed in water no surface scum is produced and the solution resulting is uniform in appearance.

The tabletable materials which can be lubricated with the coated oil particles and siloxane polymer can be any materials which are cohesive enough when compressed to form and retain a tablet shape. Such materials can be disinfectants, germicides or oral hygienic compositions, which disintegrate when placed in water to form cleaning solutions of various types. Inclusion of quaternary compounds are particularly useful due to their surface tension reducing properties as well as their bactericidal properties. The preferred materials are water-soluble tabletable components which are capable of dissolving to produce clear solutions, especially effervescent mixtures comprised of an alkali metal carbonate or bicarbonate and an acid such as malic, citric or tartaric acid, which mixtures re capable of rapidly releasing carbon dioxide upon contact with water. When the carbon dioxide has been released, the solution formed is useful for its alkalizing properties when taken orally. The uniformity of the solution formed is desirable for such internal use. For such solutions, surface scum is not commercially acceptable.

Various therapeutic compositions can also be tableted by use of the combination lubricant. Thus, the tabletable materials can also include at least one therapeutic agent, a water-soluble excipient, or any necessary coloring agents, flavoring agents, diluents, binders or disintegrators. If necessary, binders can be added to the tabletable composition to promote cohesion when compressed; however, most of such compositions can be tableted only by hand since they cause binding and scoring of the punches and dies of power driven tableting machines. In order to attain commercial production speeds, a tableting lubricant such as that of the present invention must be employed to reduce surface friction and internal compression friction.

The combination lubricant of the present invention can be used as the sole lubricant or it can be employed in conjunction with other lubricants when such are included in tabletable compositions since the combination of the siloxane polymer and the coated oil particles is compatible with other lubricants. Moreover, the combination of the coated lubricant particles with the siloxane polymer can be substituted in whole or in part for various other materials which function as tablet lubricants during compression. Also the coated lubricating oil particles can be made from non-toxic materials which are generally accepted for use in pharmaceutical and food preparations.

When amounts of the lubricant of about from 0.5 to 2 percent of the weight of the lubricated tabletable material are employed tableting rates from the low non-commercial rates up to about 5,000 tablets per minuate on rotary tableting machines containing 49 punch and die sets can be employed. Each punch and die set produces approximately 102 tablets per minute in such machines. On a rotary machine containing 33 punch and die sets, tablets can be compressed at a rate of 76 tablets per minute per set for a total production of about 2,500 tablets per minute. Generally, amounts of at least about 0.5 percent of the coated lubricant oil particles in combination with the siloxane polymer based on the weight of the lubricated tabletable material are sufficient to allow high speed tableting. When amounts of the combined lubricant up to about 5 percent are employed the amount of oil in the total tablet is so small that the oil is completely dispersible in the solutions formed and hence a uniform solution is formed. When the combined lubricant is used as one of two or more tableting lubricants a proportionally smaller amount can be employed.

The combined lubricant of the present invention may have the siloxane polymer combined with the lubricating oil in the coated particles or it may have the siloxane polymer applied to the surfaces of the coated lubricating oil particles. When the siloxane is combined with the lubricating oil in the coated particles the steps for manufacturing the same are: (1) preparing at room temperature, an oil-in-water emulsion of the lubricating oil which contains in the water phase, an oil insoluble film-forming substance in the proportion of about from 1 to 9 weight parts per 1 weight part of the lubricating oil, and which contains in the oil phase a siloxane polymer in an amount of about from 10 to 40 weight percent based on the weight of the oil (2) maintaining the emulsion at about 15° C. or above, (3) spraying the emulsion into a moving air stream having an initial temperature prior to contact with the emulsion of about from 150° C. to 290° C., (4) drying the emulsion to a moisture content of about 2 to 10 percent and (5) collecting the dried, coated particles of oil having the siloxane suspended therein. The proportion of 2 to 4 weight parts of the film-forming substance per 1 weight part of the lubricating oil is preferred in order to remain well below the 9:1 limit where the oil content becomes insufficient. A final water content of about 3 to about 5 percent and temperatures in a range of about 15° C. to about 40° C. for step (2) are preferred.

Further, it has been found that the higher air temperatures, in the range of about 240° C. to about 265° C. are preferred. The drying process can be carried out by allowing the emulsion to be sprayed into the moving air stream at a low pressure differential from a rotating spray wheel or a nozzle.

When the siloxane polymer is to be applied to the surface of the coated oil particles the siloxane polymer is not added into the oil-in-water emulsion of step (1), above, but is added to the collected dried, coated oil particles by spraying so that an amount of about from 10 to 40 percent of the siloxane based on the total weight of the lubricating oil is added to the surfaces thereof. In either process, non-aqueous continuous phases can be used for the emulsion providing such are compatible with all components.

The moisture content of the coated oil particles can be readily controlled by varying the emulsion flow rate at a constant air temperature and air flow rate. Conversely, the emulsion flow rate can be held constant and the air flow rate varied. The air stream does not require special drying in order to have low humidity, since the equilibrium humidity at temperatures in the above range is sufficiently low to provide quick drying of the excess water from the emulsion formed.

The process of drying is, preferably, carried out in standard spray-drying equipment wherein an emulsion outlet is associated with a distribution wheel which spins the emulsion out into the gas space enclosed by the apparatus. In such apparatus the wheel is spun at about 40,000 r.p.m. by application of air pressure to a turbine connected with the wheel. The inlet ports for the heated air stream are spaced near the distribution wheel and the dry-mixable coated oil particles are collected as a powder at the bottom of the spray drying apparatus. The air as it leaves the drier with the particles has a temperature of about 70° C. to 115° C.

While spray drying is the preferred process other methods such as lyophilization can also be used to dry the emulsion.

The emulsion for the above processes can be prepared by making a solution of a water-soluble oil-insoluble film-forming substance with as little water as necessary in order to form the solution, adding thereto the lubricating oil and emulsifying by vigorous agitation. Other orders of addition can also be employed. Additional water can be added to the thus formed emulsion in order to attain the desired spray chracteristics, with care that water is not to be added to the point where the ability to drive off such water is exceeded.

The film-forming substances can be any of a broad range exemplified by: water-soluble gums, modified celluloses, proteinaceous materials, polymeric sea plant derivatives, agar-agar, or synthetic film-forming substances such as polyvinyl pyrrolidone. The water soluble gums can be gum arabic (gum acacia), pectin, gum tragacanth, gum Karaya, guar gum, locust bean gum, and starch gum (dextrin) in either natural or modified form such as carboxylated dextrin. The modified celluloses may be ethers or esters such as hydroxypropylmethyl cellulose or carboxymethyl cellulose. Proteinaceous materials which may be employed are, among others, gelatin, albumin and casein. Various polymeric sea plant derivatives such as algins, alginates, and carragheenates can also be employed. The synthetic film-forming substances can be water-soluble or water dispersible polymers. Generally, these substances are polymeric in nature and form resinous layers about the oil particles upon being dried. They are also oil-insoluble with respect to the lubricating oil with which they are used and are, preferably water-soluble for convenience in forming the emulsion.

The dextrins or starch gums are particularly preferred for the film-forming materials since they are highly oil-insoluble and water-soluble and release bound water in a rapid manner during spray drying.

The lubricating oil which is coated with the above film-forming substance can be any of the normally employed viscous vegetable, animal, synthetic, or mineral oils including those which have been heretofore used for providing tableting lubrication. Examples of vegetable oils are those obtained from the following sources: corn, cotton seeds, coconuts, peanuts, olives, soy beans, sunflower seeds, palm kernels, flaxseeds, safflower seeds, etc. Examples of animal oils are cod liver, seal, whale, and neat's-foot oils. Examples of synthetic oils are polyethylene glycols of the molecular weight range 250 to 2000. The mineral oils usable are those which are highly purified. The oils may be hydrogenated as desired to provide greater saturation of the fatty acid moieties thereof.

It is generally preferred to employ such hydrogenated oils having viscosities in the range of 120 to 140 centipoises (cps.) and having good heat and oxidative stability. Such oils are resistant to rancidification and do not chemically degrade during the spray drying process. Purified or refined oils of the same viscosity range are also preferred since their properties can be reproducibly controlled.

The usuable siloxane polymer of this invention can be any of the siloxanes having a viscosity in the range of about from 250 to 12,500 cps. ±5% and having the unit formula:

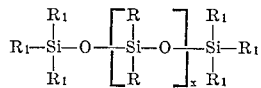

wherein each R can be a hydrogen tom, an alkyl group, an aryl group, an aralkyl group, or an alkaryl group; wherein each $R_1$ can be any of these groups except hydrogen; wherein either of the R groups of the unit formula can be the same or different groups; and wherein any of the $R_1$ groups can be the same or different groups. Mixtures of the siloxanes are also usable. The preferred polymers are the linear dialkyl polysiloxanes.

Examples of usable polysiloxanes are polymers of dihydrogen siloxane, methyl hydrogen siloxane, dimethyl siloxane, propyl hydrogen siloxane, dipropylsiloxane, phenyl hydrogen siloxane, benzyl hydrogen siloxane, tolyl hydrogen siloxane, and mitxures of dimethyl siloxane and methyl hydrogen siloxane. All of these siloxane polymers have terminal groups in which $R_1$ of the formula can be an alkyl, an aryl, an alkaryl or an aralkyl group or combinations thereof.

Another variation of this invention is to incorporate any desired flavoring agents into the oil prior to forming the coated particles. Essential oils are particularly suited for this manner of inclusion into the lubricating oil particles.

Description of the preferred embodiment

The preferred lubricant of the present invention is formed by first making a fine dispersion of a linear polydimethyl siloxane in the lubricating oil prior to forming the emulsion in the above manner. The preferred polydimethyl siloxane has a molecular weight in the range of about 15,000 to 16,000 and a viscosity in the range of about 350 centipoises ±5 percent. This siloxane polymer is not cross-linked between polymer chains and each chain has trimethyl siloxane terminal groups.

The lubricating oil employed is a heat and air (oxygen) stable refined vegetable oil having a viscosity in the range of about 120 to 140 cps. The siloxane is added into the oil in an amount of about from 10 to 40 weight percent based on the weight of the oil. The prepared dispersion is then mixed with a starch gum solution and agitated to form an emulsion. The emulsion is dried in the above-described manner by spraying into an air stream maintained at about 250° to 265° C. which exists from the spray drier at a temperature of about 110±5° C. The resulting coated oil particles have a moisture content of about 2 to 4 weight percent, are nearly free flowing, and when mixed with dry powdered tabletable materials, enhance the free flowing characteristics of such materials.

The spray dried combination lubricant, when incorporated with a tabletable composition, aids the flowing of such material into the dies of a tableting machine and provides both surface lubrication and compression lubrication during tableting. The punch and die wall surfaces are found to be substantially free from any retained materials when the lubricant of the present invention is employed. When tablets made with this lubricant and other materials which are otherwise soluble are dissolved in water no surface scum results and uniform solutions or dispersions are formed.

These and other aspects of the present invention will be apparent to those skilled in this art from the following examples which are intended to be illustrative and not limitative. The concentrations of the components are stated as weight percents of the weight of the lubricated material as tableted.

EXAMPLE I

| Emulsion components | Weight lbs. | Weight percent |
|---|---|---|
| Starch gum | 100 | 30.7 |
| Refined vegetable oil | 50 | 15.3 |
| Polydimethyl siloxane | 11 | 3.4 |
| Deionized water | 165±1.7 | 50.6 |
| Total | 326±1.7 | 100.0 |

The starch gum was a stable corn dextrin having the following characteristics: viscosity—120 to 140 cps., particle size—98 percent of the powder passes through a 40 mesh screen (U.S. Standard), and color-light tan. A dextrin of this description can be obtained from National Starch and Chemical Company, Inc., New York, N.Y., under the trade name "Nadex 772."

The vegetable oil had good heat and air stability and was resistant to rancidification. The free fatty acids content thereof was 0.05% maximum, the oxygen stability was 450–500 hours as measured by the Active Oxygen Method (Tentative Method Cd 12–57, revised 1959, published in "Official and Tentative Procedures of the American Oil Chemists Society," 3rd Ed., 1966, Chicago, Illinois), and the Wiley melting point was 22±2° F. The major fatty acid moieties were: palmitic 8 to 10 percent, stearic 2 to 4 percent, oleic 43 to 47 percent, elaidic 39 to 43 percent, and linoleic 1 to 3 percent. A vegetable oil of this description can be obtained from Durkee Famous Foods, Inc. Cleveland, Ohio under the trade name "Durkex 500."

The polydimethyl siloxane had a viscosity of 350 centipoises ±15 percent, a molecular weight in the range of 15,000 to 16,000 and was of the standard type having recurring polydimethylsiloxane units terminated by trimethyl siloxane groups.

Four (4) batches of the above emulsion formulation were made up and spray dried. The starch gum of each batch was added to the water and the polydimethyl siloxane was added to the vegetable oil. The oil mixture was added to the gum solution with agitation in order to produce a homogeneous emulsion.

Each emulsion batch was then spray dried in a large spray drier having a drop distance of about 18 feet from the emulsion outlet to the exit port. This spray drier had an atomizing wheel centrally disposed in the upper portion of the drying chamber, an air inlet port for heated air spaced directly below the atomizing wheel, and an outlet port at the bottom of said chamber for removing the dried oil particles and the air. the emulsion batches were fed through a conduit tube from a holding tank to the atomizing wheel and the bulk of the coated oil particles were collected at the outlet port. The fines were removed by a cyclone separator connected to the exit air stream and added to the main body of the particles. The air inlet temperature was maintained at about 266° C. with the equilibrium moisture content at that temperature. The air flow rate through the chamber was held at a rate sufficient to reduce the moisture of the lubricant particles to about 2 weight percent. The exit air temperature was about 102° C. A total drying time of six (6) hours was required to dry the four emulsion batches. The 52 lbs. weight loss was distributed in the following manner: 20 lbs. moisture loss in the 400 lbs. of starch gum in going from an initial 7 percent moisture to 2 percent moisture, 15 lbs. particles loss due to incomplete recovery and 17 lbs. lost from first batch put through the drier.

This dried combination lubricant was dry-mixable with powdered tabletable materials and was found to be stable and easily shipped in sealed containers.

This spray dried lubricant was used as component (3) to lubricate mouthwash tablets compressed from the following formulation:

Tablet formulation: Weight, g.
 (1) Sodium bicarbonate _____ 2200.0
 (2) Citric acid (anhydrous) _____ 1742.0
 (3) Coated lubricant particles _____ 75.0
 (4) Flavoring (powdered) _____ 100.0
 (5) Dye, blue lake _____ 0.9
 (6) Sodium cyclohexylsulfamate _____ 20.0
 (7) Sodium saccharin _____ 2.0
 (8) Cetyldimethylbenzyl ammonium chloride _____ 10.0

Total _____ 4149.9

The powdered components were mixed in the order of their decreasing amounts, i.e., components Nos. 1, 2, 4, 3, 6, 8, 7 and 5. The dry tabletable mixture was then tableted on a single punch machine fitted with one inch diameter punches. The tablets were 0.2 inch thick and showed a hardness of about from 3 to 4 kg. on a Stokes Hardness tester. They dissolved in an average time of 42 seconds at 23° C.

The coated lubricant particles provided excellent lubrication for these mouthwash tablets as evidenced by the following stability test which was conducted on the tablets when stacked in threaded glass jars sealed with lined metal screw caps. For this test two of the capped bottles were separately stored for two weeks at 40° C. and at 50° C. Various properties of the tablets after this period of storage were then compared to the original properties prior to the test. The resulting data is given in Table 1, below.

The first property measured was the appearance. The notations NC and Sl.Y. have been used to designate no change and slight yellowing, respectively, and are based on the appearance of the original tablets. The hardnesses of the tablets were then measured on a Stokes Hardness tester. The disintegration times in 135 ml. of 43° C. water were measured and the pH's of the resulting solutions were taken. The tablets were then analyzed for the active amount of the quaternary ammonium salt, component No. 8.

A modified phenol coefficient test using *S. aureus* was conducted by dissolving one of the tablets from each storage condition in 135 ml. of 43° C. water. The method used is described in Horwitz, W.: Official Methods of Analysis of the AOAC, 10th ed., Association of Official Agricultural Chemists, Washington, D.C. (1965), pp. 80–94. The results of this test were recorded in terms of the time required for complete bacterial kill.

TABLE 1.—TABLET STABILITY RESULTS

| Time, temperature | Appearance | Hardness, kg. | Hardness, Disintegration time, sec. | pH. | Quaternary, mg./tablet | Complete kill time, minutes |
|---|---|---|---|---|---|---|
| Original, 22° C | | 6.4 | 33 | 6.4 | 9.98 | 5 |
| 2 weeks, 40° C | NC | 8.7 | 33 | 6.6 | 9.54 | 10 |
| 2 weeks, 50° C | Sl. Y. | 10.7 | 33 | 6.8 | 8.67 | 10 |

From these results it can be seen that the accelerated aging has not markedly altered these properties of the tablet and that the tablet was stable and remained effective.

EXAMPLE II

| Emulsion components | Weight, g. | Weight percent |
|---|---|---|
| Starch gum | 500 | 19.2 |
| Refined vegetable oil | 500 | 19.2 |
| Polydimethyl siloxane | 92 | 3.5 |
| Nonionic surfactant | 12 | .4 |
| Deionized water | 1,500 | 57.7 |
| Totals | 2,604 | 100.0 |

In the above formulation the weight ratio of gum to oil is 1:1. With the addition of the siloxane to the oil the actual weight ratio for the combination lubricant was less than 1:1. The nonionic surfactant was Polysorbate 80, U.S.P. XVII, sold under the trade name "Tween 80" by Atlas Powder Company.

The water was heated to 40° C. and then the gum was dispersed therein. The siloxane polymer was combined with the vegetable oil and heated until a clear solution was formed (60° C.). The nonionic surfactant was then added to the heated oil mixture and the latter then added to the gum solution while agitating with a high speed mixed to form a stable emulsion.

The emulsion was spray dried in a standard laboratory spray drier having an atomizing wheel centrally disposed in the upper portion of the drying chamber, an air inlet port equipped with a heater spaced directly below the atomizing wheel, and an outlet port at the bottom of said chamber for removing the particles and the air. The emulsion was fed through a conduit tube from a holding tank to the atomizing wheel. The emulsion then fell through the moving air stream for a distance of about 4 feet to the bottom of the drier, and the resulting dried, coated siloxane-oil particles were collected by a cyclone separator. The drier used was a Nerco-Niro Portable Spray Drier manufactured by Nichols Engineering and Research Corporation, New York, N.Y. The inlet air temperature was maintained at about 265° C. with the equilibrium moisture content at that temperature. The exit air had a temperature of about 115° C.

The atomizing wheel was rotated at about 40,000 r.p.m. by supplying air to a connected drive turbine at a pressure of 5.8 to 6.2 kg./cm.$^2$.

The coated siloxane-oil particles collected had a moisture content of about 2 weight percent.

EXAMPLE III

| Emulsion components | Weight, g. | Weight percent |
|---|---|---|
| Gum acacia | 1,450 | 27.9 |
| Gelatin | 250 | 4.8 |
| Refined corn oil | 425 | 8.2 |
| Polydimethyl siloxane | 80 | 1.5 |
| Deionized water | 3,000 | 57.6 |
| Total | 5,205 | 100.0 |

The components of this emulsion were all of high purity suitable for food usage. The weight ratio of the film formers (acacia and gelatin) to the oil was 4:1 and to the oil plus the dimethyl siloxane was 3.37:1.

The gelatin was dissolved in 750 ml. of the water which had been heated to about 65° C. The gum acacia was then dispersed in 2000 g. of the water. The siloxane was added to the corn oil and the resulting mixture was added to the gelatin solution with agitation. This emulsified mixture was then added to the acacia solution with mixing.

The emulsion was then spray dried in a unit such as that described in Example II, wherein the air entered at 265±10° C. and exited at 110±5° C. The coated lubricant particles collected had a moisture content of about 2.6 weight percent and were nearly free-flowing.

These coated siloxane-oil particles were employed to lubricate two different tabletable formulations, one an effervescent mixture and the other a noneffervescent antihistamine preparation.

The first tablet formulation was as follows:

Tablet components: Weight, g.
    Sodium bicarbonate _____ 1909
    Citric acid (anhydrous) _____ 1206
    Coated lubricant particles _____ 100
    Flavoring _____ 20
    Stannous fluoride _____ 2
    Sodium cyclohexylsulfamate _____ 24
    Sodium saccharin _____ 2.4
    Cetyldimethylbenzyl ammonium chloride __ 0.5
        Total                               326.9

The above components were blended together by passing them repeatedly through No. 14 and No. 30 screens (U.S. Standard). The mixture was then tableted on a single punch tableting machine. The resulting tablets when placed in water disintegrated quickly to form a mouthwash solution.

The coated siloxane-oil particles were present in this first tablet formulation in a weight concentration of about 3 percent.

The antihistamine preparation with the lubricant included had the following composition:

Tablet components: Weight, g.
    Methapyriline·HCl _____ 25
    Dicalcium phosphate (granulated) _____ 425
    Coated lubricant particles _____ 125
        Total                               575

The components were mixed by passing them through a No. 16 hand screen (U.S. Standard). The mixture was tableted on a single punch tableting machine with the result that the punch faces and die wall surfaces were free from any visible retained material.

The active ingredient of these tablets, methapyriline·HCl, is a nonhabit-forming, sleep inducing antihistamine.

The coated lubricant particles were present in this second formulation in a weight concentration of about 22 percent.

EXAMPLE IV

| Emulsion components | Weight, g. | Weight percent |
|---|---|---|
| Gelatin | 100 | 2.6 |
| Olive oil | 200 | 5.2 |
| Gum acacia | 1,100 | 28.6 |
| Polydimethyl siloxane | 40 | 1.1 |
| Water | 2,400 | 62.5 |
| Total | 3,840 | 100.0 |

The gelatin was dissolved in 300 g. of heated water. The polydimethyl siloxane was added to the olive oil and this mixture added to the gelatin solution with agitation. The mixture was then mixed at a high speed until a homogeneous emulsion was formed. The gum acacia was then suspended in the remaining water (2100 g.) and an amount of this solution equal to the amount of the homogeneous emulsion was then added and the resulting mixture emulsified by passing it through a hand homogenizer. The remaining acacia solution was then added with further agitation. The ratio of the film formers to the oil was 6:1.

Tablet formation: Weight, g.
    Sodium bicarbonate _____ 1909
    Citric acid (anhydrous) _____ 1206
    Coated lubricant particles _____ 200
    Flavoring _____ 20
    Sodium perborate _____ 200
    Sodium cyclohexylsulfamate _____ 24
    Sodium saccharin _____ 2.4
    Cetyldimethylbenzyl ammonium chloride __ 0.5
        Total                               3761.9

These components were mixed by passing them repeatedly through No. 14 and No. 30 screens (U.S. Standard). The mixture was then tableted on a single punch tableting machine. The powdered tabletable composition flowed freely and the tablets were adequately lubricated at the above level of coated oil particles. Upon dissolution of the tablets in water an oxygenated mouthwash solution was formed.

EXAMPLE V

| Emulsion components | Weight, g. | Weight percent |
|---|---|---|
| Starch gum | 900 | 35.7 |
| Refined vegetable oil | 100 | 4.0 |
| Polydimethyl siloxane | 20 | 0.8 |
| Deionized water | 1,500 | 59.5 |
| Total | 2,520 | 100.0 |

The weight ratio of the starch gum to the oil in this emulsion was 9:1. The emulsion was made by dispersing the starch gum in room temperature water with agitation. The polydimethyl siloxane was added to the vegetable oil and the resulting mixture was then added to the gum solution with agitation.

The emulsion was dried in a standard spray drier wherein air entered at 250±10° C. and exited at 100±5° C. The moisture content of the coated lubricant particles recovered was about 2 percent.

This lubricant was used to provide lubrication in the following tablet formulation:

Tablet component: Weight, g.
    Sodium bicarbonate _____ 2200
    Citric acid (anhydrous) _____ 1542
    Coated lubricant particles _____ 200
    Flavoring _____ 100
    Laked dye _____ 0.9
    Sodium cyclohexylsulfamate _____ 20
    Sodium saccharin _____ 2
    Cetyldimethylbenzyl ammonium chloride __ 10
        Total                               4074.9

These components were blended by screening and were tableted on a machine fitted with one inch punches. The tablets produced dissolved in water to produce a pleasant tasting mouthwash solution. The tablets exhibited medium breaking strength.

In summary, a new tableting lubricant is formed of a combination of a siloxane polymer and dry-mixable particles of a lubricating oil coated with an oil-insoluble film-forming substance, the siloxane polymer being either suspended in the lubricating oil or applied to the coating therefor.

What is claimed is:

1. A tablet producing a clear aqueous solution and being free from insoluble tablet lubricants or other tablet excipients or components which cause a tablet formed from an otherwise soluble composition to produce a clouded suspension having undesirable surface scum rather than a uniform solution when dissolved in water consising essentially of a compressed, essentially free-flowing mixture of a powdered, water-soluble, tabletable essential active ingredient and, as the essential tablet lubricant, a dry-mixable tableting lubricant comprising a siloxane polymer and lubricating oil particles coated with an oil-insoluble, water-soluble film-forming substance, said siloxane polymer having the unit formula:

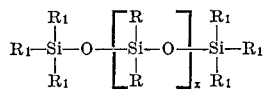

wherein R is hydrogen, alkyl, aryl, aralkyl or alkaryl and $R_1$ is alkyl, aryl, aralkyl or alkaryl, and having a viscosity in the range of about from 250 to 12,500 cps., said siloxane polymer being either applied to the surfaces of the coated lubricating oil particles or being combined with the lubricating oil in the coated particles, said lubricating oil particles being selected from the group consisting of vegetable oils, animal oils, mineral oils and synthetic polyethylene glycols of the molecular weight range 250 to 2,000, said oil-insoluble, water-soluble film-forming substance being selected from the group consisting of water-soluble gums, modified celluloses, proteinaceous materials, polymeric sea plant derivatives, agar-agar and synthetic film-forming polymers.

2. The tablet of claim 1 wherein said film-forming substance is present in an amount of about from 9 to 1 parts to 1 part of said lubricating oil particles.

3. A tablet according to claim 1 wherein said powered, water-soluble, tabletable essential active ingredient is an internal use oral therapeutic agent, effervescent couple alkalizer, quaternary ammonium disinfectant, solution-forming, external use, solid surface general cleansing germicide, mouthwash concentrate or allied oral hygienic composition.

References Cited

UNITED STATES PATENTS

| | | | |
|---|---|---|---|
| 2,035,267 | 3/1936 | Fleischman | 424—53 |
| 2,913,373 | 11/1959 | Weisz et al. | 424—52 |
| 3,082,091 | 3/1963 | Smith et al. | 424—44 |
| 3,105,792 | 10/1963 | White | 424—44 |
| 3,136,692 | 6/1964 | Bandelin | 424—44 |
| 3,210,208 | 10/1965 | Grass et al. | 106—148 |
| 3,282,792 | 11/1966 | Fiscella | 424—52 |
| 3,355,392 | 11/1967 | Cantor et al. | 424—329 XR |
| 3,382,150 | 5/1968 | Grass et al. | 424—32 |

OTHER REFERENCES

Merz: Dtsch. apoth. ztg. 95; 1243 (1955).
Merz: Dtsch. apoth. ztg. 98, 22–224 (1958).
Gelbrecht: Dtsch. apoth. ztg. 98, 799–800 (1958).
Merz: Pharm. industrie 21; 497–500 (1959).

SHEP K. ROSE, Primary Examiner

U.S. Cl. X.R.

424—49, 52, 53, 148, 184, 379, 261; 264—39, 300, 338; 252—1, 9, 10, 11, 186, 350, 106; 117—100; 106—38.22; 8—19; 99—77.1, 78, 79, 140 148